United States Patent
Kulkarni et al.

(10) Patent No.: US 7,763,688 B2
(45) Date of Patent: Jul. 27, 2010

(54) SOLUBLE POLYMERS COMPRISING UNSATURATION AND PROCESS FOR PREPARATION THEREOF

(75) Inventors: Mohan G. Kulkarni, Pune (IN); Rohini N. Karmalkar, Pune (IN); Sunita S. Satav, Pune (IN)

(73) Assignee: Council of Scientific and Industrial Research (IN)

( * ) Notice: Subject to any disclaimer, the term of this patent is extended or adjusted under 35 U.S.C. 154(b) by 0 days.

(21) Appl. No.: 12/257,996

(22) Filed: Oct. 24, 2008

(65) Prior Publication Data

US 2009/0076181 A1 Mar. 19, 2009

Related U.S. Application Data

(62) Division of application No. 10/700,511, filed on Nov. 5, 2003, now abandoned.

(51) Int. Cl.
  *C08F 2/06* (2006.01)
  *C08B 37/16* (2006.01)

(52) U.S. Cl. ............... 526/200; 524/48; 526/238.2; 526/303.1; 526/307.7; 526/307.8; 526/317.1; 526/318.43; 526/318.6; 526/320; 526/323.1; 526/323.2; 526/336

(58) Field of Classification Search ........... 524/48; 526/200, 238.2, 303.1, 307.7, 307.8, 317.1, 526/318.43, 318.6, 320, 323.1, 323.2, 336
See application file for complete search history.

(56) References Cited

U.S. PATENT DOCUMENTS

| 4,645,810 | A | 2/1987 | Fischer |
| 4,897,215 | A | 1/1990 | Trieselt et al. |
| 4,906,488 | A | 3/1990 | Pera |
| 5,258,414 | A | 11/1993 | Bergishagen |
| 5,268,286 | A | 12/1993 | Kobayashi et al. |
| 5,290,831 | A | 3/1994 | Di Ruocco et al. |
| 5,521,266 | A * | 5/1996 | Lau ............... 526/200 |
| 5,756,559 | A | 5/1998 | Blackwell et al. |
| 6,180,739 | B1 | 1/2001 | Bowen |
| 6,229,062 | B1 * | 5/2001 | Mandell et al. ....... 604/367 |
| 6,646,068 | B2 | 11/2003 | Chisholm et al. |
| 6,691,715 | B2 | 2/2004 | Matz et al. |
| 6,727,320 | B2 | 4/2004 | Attarwala et al. |
| 2003/0130416 | A1 * | 7/2003 | Flosbach et al. ....... 524/801 |

OTHER PUBLICATIONS

Storsberg, J., Rigger, H. Macromolecular Communications. 21, 230, 2000.
Jeromin, J. Ritter, H. Macromolecular Communications, 19, 377, 1998.
Jeromin, J. Noll, O. Ritter, H. Macromolecular Chemistry & Physics, 199, 2641, 1998.
Glockner, P., Ritter, H. Macromolecular Rapid Communications, 20, 602, 1999.
Van E.S.J.J. In Polymeric Dispersions Principles and Applications, Asua, J.M. (Ed), Kluwer Publishers, 1997, p. 451.
Ooka, M. Ozawa, H. Porgess in Organic Coatings, vol. 23, 1994, p. 325.

* cited by examiner

*Primary Examiner*—Helen L. Pezzuto
(74) *Attorney, Agent, or Firm*—Lowe Hauptman Ham & Berner, LLP

(57) ABSTRACT

The present invention describes the synthesis of solvent soluble copolymers containing multiple unsaturations. These copolymers contain reactive vinyl groups, which can be further reacted in a second stage polymerization. The process involves copolymerization of a vinyl monomer with an inclusion complex of a monomer having multiple unsaturations and a cyclic macromolecular compound to yield soluble polymers. These polymers may be cast into films, membranes or may be converted in micro or nanoparticles and then crosslinked in a second step polymerization.

22 Claims, No Drawings

SOLUBLE POLYMERS COMPRISING UNSATURATION AND PROCESS FOR PREPARATION THEREOF

CROSS-REFERENCE TO RELATED APPLICATIONS

The present application is a Divisional Application of U.S. patent application Ser. No. 10/700,511, filed Nov. 5, 2003, now abandoned the disclosure of which is hereby incorporated by reference herein in its entirety.

FIELD OF THE INVENTION

The present invention relates to soluble copolymers comprising unsaturation and a process for the preparation thereof. More particularly, it relates to polymers of the formula $[(Ax)(By)]_n$, wherein A is any vinyl monomer comprising one unsaturation, B is any vinyl monomer containing multiple unsaturation and x, y and n are any integral values greater than zero. In our co-pending application No. NCL-28-2002 (PCT Application No. PCT/IB03/03593) we have described the process for the preparation of inclusion complexes of cyclic macromolecular compounds with monomers containing multiple unsaturation. Polymerization of such complexes with vinyl substituted monomers yields polymer that are soluble in solvents and have unsaturated sites for further modification.

BACKGROUND AND PRIOR ART

Thermosetting polymers can not be converted into a molten state or dissolved in solvents. Although these materials offer enhanced mechanical and thermal properties over the thermoplastics, they cannot be readily processed into finished products using processing techniques, commonly used in the case of thermoplastics. Similarly, the properties of the thermoplastics cannot be significantly enhanced after converting the resins into finished products since there is no scope to modify the polymer structure chemically after the polymerization is completed.

In certain thermosetting polymers, reactive groups are introduced in the backbone. These polymers are usually in the form of lattices that are further crosslinked either thermally or by addition of functional groups like isocyanates, amines or metal ions. These resins attain their desired properties i.e., insolubility in most organic solvents, good water resistance and hardness by network formation and are used as coatings. (Van E.S.J.J. in *Polymeric Dispersions Principles and Applications*. Asua, J. M. (Ed), Kluwer Publishers, 1997, p. 451; Ooka, M. Ozawa. H. *Progress in Organic Coatings*, vol. 23, 1994, p. 325). The need for polymers which are water soluble and thermally fusible and which could be later converted into products having enhanced mechanical/thermal/solvent resistance properties is increasing with growing applications of polymers in different fields.

Water insoluble molecules become water-soluble on treatment with aqueous solutions of cyclodextrins or similar host molecule. The inclusion phenomenon leads to significant changes of solution properties and reactivity of the guest molecule. The formation of inclusion complexes of hydrophobic monomers with β-cyclodextrin or its derivatives has been reported. (Storsberg, J., Ritter, H. *Macromolecular Communications* 21, 230, 2000. Jeromin, J. Ritter, H. *Macromolecular Communications* 19, 377, 1998. Jeromin, J. Noll, O. Ritter, H. *Macromolecular Chemistry & Physics*, 199, 2641-1998. Glockner, P. Ritter, H. *Macromolecular Rapid Communications*, 20, 602, 1999). It has been established that the reactivity ratios of complexed monomers differ significantly from those of the un-complexed monomers.

Complexes of cyclodextrin have been investigated in the past. U.S. Pat. No. 4,906,488 describes these for the release of permeants to the outside hosts. Similarly, U.S. Pat. No. 5,258,414 describes encapsulation of blowing agents into cyclodextrins and incorporation of the complexes into thermoplastics for delayed release of the blowing agents. U.S. Pat. No. 5,268,286 describes the method for polymerization of biocatalysts on polymers. Similarly, U.S. Pat. No. 5,290,831 describes the use of cyclodextrins for stabilization of the polymerization initiators as to regulate the polymerization in a desirable manner.

U.S. Pat. No. 6,180,739 describes polymerizable cyclodextrin derivatives for applications in dental resins, which adhere strongly to dentin. The said patent covers polymerizable cyclodextrin derivatives wherein cyclodextrin is reacted with a large excess of monomer so that each cyclodextrin molecule is covalently linked to a large number of polymerizable groups. The compositions are useful in dental and industrial formulations. Another feature of this invention is the presence of functional groups in the polymer structure, which can form hydrogen bonds, ionic bonds, and Van der Waal interactions with the appropriate substrate so as to enhance adhesion. The invention also covers initiators, which are encapsulated in cyclodextrin cavity. The cyclodextrin is an integral part of the polymer structure and has a functional role in application.

The said patent deals with functionalized polymers containing cyclodextrin wherein cyclodextrin are covalently bonded to a monomer that the polymer structure contains cyclodextrin. Thus, the subject matter of the invention covered by this patent is a highly substituted or derivatized cyclodextrin containing unsaturated groups. Another feature if this invention is presence of a functionalized group in the polymer structure which can form hydrogen bonds, ionic bonds, Van der Waal interactions with appropriate substrate so as to enhance adhesion. The invention also covers photo sensitive initiators, which are encapsulated in cyclodextrin. The invention thus deals with complexes of thermal initiators encapsulated in cyclodextrin derivatives. In many cases, the functional sites such as carboxyl groups present in the polymer are bridged using calcium or other di-cationic metals so as to provide cross linking.

The subject matter of our invention deals with the encapsulation of the cross linker which can contain more than one unsaturated groups. It may be noted here that the interaction between the cross linker and cyclodextrin exploited in this work is non-covalent in nature. As a result of this complexation, vinyl groups present in the cross linker but encapsulated in the cyclodextrin cavity do not take part in polymerization and prevent cross linking. Also, cyclodextrin can be removed after polymer has been formed and is not a part of the resulting polymer structure after the second stage of cross linking is effected either by thermal or photo chemical polymerization. It may be further mentioned that the initiators used by us are in their free form and are not encapsulated in cyclodextrin.

In our copending application No. NCL-28-2002 (PCT Application No. PCT/IB03/03593) we have described the preparation of inclusion complexes of cyclodextrins with monomers containing multiple unsaturations. Polymerization of these complexes gives rise to soluble homopolymers containing unsaturated sites, which can be further crosslinked. But applications of homopolymers of monomers having multiple unsaturations are limited. Copolymerization of different monomers gives rise to tailor made materials for a wide range of applications. Depending upon the composition of the comonomers, either hydrophilic, hydrophobic or amphiphilic polymers can be synthesized. If unsaturated groups are incorporated into these copolymers, they can then be converted into films, membranes or micro or nanoparticles and can be crosslinked in a second step. Such polymers would find applications in electronics, photoresists, controlled release delivery systems, micro electro mechanical systems (MEMS) etc.

OBJECT OF THE INVENTION

The principle object of the present invention is to provide soluble copolymers of vinyl monomers containing multiple unsaturations and a process for the preparation thereof.

Another object is to provide a new process for the preparation of crosslinked polymers in different forms like thin films, membranes, monolayers, micro or nanoparticles in the second step polymerization.

DETAILED DESCRIPTION OF THE INVENTION

Accordingly, the present invention provides soluble copolymers having a general formula $[(Ax)(By)]_n$, wherein A is any vinyl monomer comprising one unsaturation, B is any vinyl monomer comprising multiple unsaturation and x, y and n are any integral values greater than zero. The present invention also provides a process for preparation of soluble copolymers which comprises dissolving an inclusion complex of the monomer containing multiple unsaturation with a cyclic macromolecular compound in an appropriate solvent, adding at least one vinyl monomer and a free radical initiator to this solution and polymerizing the composition by either thermally or photochemically initiated polymerization in the presence of appropriate initiators to obtain the product.

In one of the embodiments of the present invention, the inclusion complexes are prepared as per the process claimed and described in our co-pending Application No. NCL-28-2002 (PCT Application No. PCT/IB03/03593).

In another embodiment, the content of the inclusion complex containing multiple unsaturation may be varied from 0.01 to 99.9%.

In yet another embodiment, the solvent for preparing solution of inclusion complex may be chosen from polar aprotic solvents exemplified by N, N dimethyl formamide, N, N dimethyl acetamide and dimethyl sulfoxide and water.

In still another embodiment, the vinyl monomer may be methyl methacrylate, ethyl acrylate, butyl acrylate, acrylic acid, methacrylic acid, acrylonitrile, vinyl acetate, glycidyl methacrylate, 2-hydroxyethyl methacrylate, 2-hydroxy propyl methacrylate, 2-amino ethyl acrylate hydrochloride, butyl methacrylate, cetyl acrylate, cetyl methacrylate, phenyl methacrylate, N-isopropyl acrylamide, acrylamide, N-t-butyl acrylamide, styrene and styrene sulphonic acid, allyl amine and/or its salts In another embodiment, the inclusion complex may be a monomer containing multiple unsaturation such as di, tri or tetra acrylates or methacrylates as exemplified by ethylene glycol dimethacrylate, trimethylol propane trimethacrylate, pentaerythritol trimethacrylate, pentaerythritol tetramethacrylate, bisphenol A dimethacrylate, glycerol dimethacrylate, glycerol diacrylate, vinyl methacrylate, vinyl acrylate, trimethylol propane triacrylate, pentaerythritol tetraacrylate or aromatic divinyl compounds as exemplified by divinyl benzene.

In yet another embodiment, the polymerization initiator may be chosen from azo, peroxide or redox type as exemplified by azobisisobutyronitrile, benzoyl peroxide, t-butyl hydroperoxide, potassium persulfate, and ammonium persulfate.

In yet embodiment the initiator may be chosen from a family of water soluble azoinitiators as exemplified by azobis (amidinopropane) dihydrochloride.

In yet embodiment the soluble copolymers prepared are crosslinked using conventional free radical polymerization methods to give insoluble polymers.

In one of the features of the present invention the polymerization is carried out by any of the conventional methods of polymerization given below.

i) Thermal polymerization in the temperature range 40° C. to 80° C. under inert atmosphere.
ii) Polymerization by UV irradiation at temperature in the range 4° C. to 40° C. using photoinitiators.
iii) Polymerization by γ irradiation in absence of a free radical initiator.
iv) Suspension or emulsion polymerization to obtain the polymer in spherical form.

In a feature of the present invention, the copolymers prepared using the described above are soluble in organic solvents and contain unsaturated groups.

EXAMPLES

The invention is now described below by examples, which are illustrative but do not limit the scope of the invention.

Example 1

This example provides the preparation of β-cyclodextrin-ethylene glycol dimethacrylate complex as described in our co-pending application NCL-28-2002 (PCT Application No. PCT/IB03/03593). 11.35 g (0.01 moles) β-cyclodextrin was dissolved in 450 ml distilled water at room temperature. To this 1.98 g (0.01 moles) ethylene glycol dimethacrylate (EGDMA) was added in one portion and the mixture was stirred using a magnetic stirrer for 24 hours. The complex precipitated from the solution was filtered under vacuum. The complex was washed thoroughly with distilled water to remove uncomplexed β-cyclodextrin and with methanol to remove uncomplexed ethylene glycol dimethacrylate. The complex was dried at room temperature in desiccators. The yield was 73%. The complex was characterized by 200 MHz $^1$H NMR and IR. The stoichiometry of the complex was determined from the area of the protons for β-cyclodextrin and ethylene glycol dimethacrylate and found to be 1:1. IR spectroscopy indicated the presence of unsaturation in the complex indicating the formation of inclusion complex of ethylene glycol dimethacrylate and β-cyclodextrin.

Example 2

This example describes the preparation of poly(methyl methacrylate-co-ethylene glycol dimethacrylate (EGDMA)).

0.660 g (0.495 mmoles) β-cyclodextrin-ethylene glycol dimethacrylate complex. G methyl methacrylate (9.9 mmoles) was dissolved in 5 ml N, N dimethyl formamide. To this 10 mg azobisisobutyronitrile was added and the tube was purged with nitrogen and dipped in a water bath maintained at 65° C. for 18-20 hours. The polymer was precipitated in water to remove P-cyclodextrin, which remains in the aqueous medium. It was derived in a desiccator at room temperature. The yield was 68%. The polymer was characterized by $^1$H NMR and IR spectroscopy. Both the methods showed the presence of unsaturation. $^1$H NMR (CDCl$_3$): 3.6 δ, b, OCH$_3$, 5.97, 6.17 δ, 2H, =CH$_2$ 4.00 δ, —CH$_2$ of EDA, 8 δ, s-CH$_3$, 0.58, 1.03 δ-CH$_2$—CH). IR 728 cm C=O, 1654 cm$^{-1}$-

C=C—, 2854, 2926 cm⁻¹-CH₃ 1435 cm⁻¹=CH₂. The molecular wt as determined by GPC was 88,000.

Example 3

This example shows the comparison of polymerization using a preformed complex described in the process above and by a conventional technique in the presence of (β-cyclodextrin 1 g methyl methacrylate (9.9 mmoles), 0.098 g ethylene glycol dimethacrylate (0.49 mmoles) and 0.562 g (0.49 mmoles) β-cyclodextrin were dissolved in 6 ml N, N dimethyl formamide. 10 mg azobisisobutyronitrile was added and the tub was purged with nitrogen for 10 minutes. The polymerization was carried out at 65° C. for 20 hours. The polymer was obtained in the form of an insoluble gel.

Example 4

This example provides the preparation of p(methyl methacrylate-co-vinyl methacrylate). 1 g methyl methacrylate (9.9 mmoles), 0.617 g (0.495 mmoles) β-cyclodextrin-vinyl methacrylate complex were dissolved in 5 ml DMF. 10 mg azobisisobutyronitrile was added and the test tube was purged with nitrogen for 20 minutes. The polymerization was carried out at 65° C. for 18 hours. Polymer was obtained by precipitating in water. The polymer yield was 70% and the molecular wt as characterized by GPC was 32,300 and polydispersity 6.5. The polymer was characterized by ¹H NMR and IR spectroscopy. ¹HNMR (CDCl₃): 3.57 δ, b, —OCH3, 5.16, 6.17 δ, =CH₂ of VMA, 1.85 δ —CH₃, 0.82-0.92 & —CH—CH2-. IR 728 cm C=O, 1646 cm C=C, 2854, 2926 cm⁻¹ CH3, 1435 cm⁻¹=CH2.

Example 5

This example provides the preparation of β (vinyl acetate-co-vinyl methacrylate).

1 g (11.6 mmoles) vinyl acetate, 0.724 g (0.59 mmoles) β-cyclodextrin-vinyl methacrylate complex was dissolved in 5 ml DMF. To this 10 mg AIBN was added and the test tube was purged with nitrogen for 15 minutes. Polymerization was carried out at 65° C. for 18 hours. The polymer was isolated by precipitation in water. The yield obtained was 72% and the molecular wt was 4500. The polymer was characterized by ¹H NMR and IR spectroscopy.

Example 6

This example provides the preparation of p(vinyl acetate-co-ethylene glycol dimethacrylate (EGDMA)).

1 g (11.6 mmoles) vinyl acetate, 0.773 β-cyclodextrin-ethylene glycol dimethacrylate complex were dissolved in 5 ml DMF. To this 10 mg AIBN was added and the polymerization was carried out at 65° C. for 18 hours. Polymer was obtained by precipitation in water. The yield was 74%. Molecular wt of the polymer was 4335. The polymer was characterized by ¹H NMR and IR spectroscopy.

¹H NMR (CDCl₃) 2.05 δ, b, —CH3 of vinyl acetate, 79 fi-(CH2-CH), 4.08 δ, d, —CH2 of EDA, 5.58, 6.08 δ s, —CHj. IR (nujol) 1720 cm⁻¹, C=O 1643 cm⁻¹ C=C, 606 cm 947 cm⁻¹ 1022 cm⁻¹, 1238 cm⁻¹, 2856, 2924 cm⁻¹-CH₃.

Example 7

This example provides the preparation of p(methyl methacrylate-co-trimethylol propane trimethacrylate (TRIM)).

1 g methyl methacrylate (9.9 mmoles) and 0.73 g (β-cyclodextrin-trimethylol propane trimethacrylate (TRIM) complex {1:2} was dissolved in 5 ml DMF. To this 10 mg AIBN was added and the test tube was purged with nitrogen for 10 minutes. Polymerization was carried out at 65° C. for 20 h and the polymer was obtained by precipitation in water. The yield was 69%. The molecular wt of the polymer measured by GPC was 40,200 and the polydispersity 9.2. The polymer was characterized by ¹H NMR and IR spectroscopy.

'H NMR (CDCl₃): 3.6 OCH₃ of methyl methacrylate, 5.9, 6.15 δ, d, =CH₂ 1.97 δ-CH₃, 2.75 2.92 δ, —CH₂—O IR (nujol): 1728 cm⁻¹ C=O, 1672 cm⁻¹, 1435 cm⁻¹=CH₂, 2927 cm⁻¹, 2950 cm⁻¹-CH₃.

Example 8

This example provides the preparation of p(methyl methacrylate-co-ethylene glycol dimethacrylate (EGDMA)) by photopolymerization.

0.5 g methyl methacrylate (4.95 mmoles) and 0.33 g (0.25 mmoles) p-cyclodextrin-ethylene glycol dimethacrylate complex were dissolved in 2 ml dimethyl formamide. To this 5 mg 1-hydroxy cyclohexyl phenyl ketone was added and the solution exposed to UV irradiation at room temperature for 20 minutes. The polymer was obtained by precipitation in water. The yield was 60%. The polymer was characterized by ¹H NMR and IR spectroscopy. The molecular wt of the polymer was $M_w$=6530, $M_n$=2490 & Polydispersity 2.6.

Example 9

This example provides the preparation of p(methyl methacrylate-co-ethylene glycol dimethacrylate).

2 g (0.0198 moles) methyl methacrylate and 5.3 g (3.9 mmoles) β-cyclodextrin-ethylene glycol dimethacrylate were dissolved in 20 ml N. N dimethyl formamide. To this 20 mg azobisisobutyronitrile was added and the polymerization was carried out at 65° C. for 20 hours. The polymer was obtained by precipitation in water. The yield was 74%. The molecular wt of the polymer as determined by GPC was $M_w$=42,000, $M_n$32 19,700, $M_w/M_n$=2.1. The polymer was characterized by ¹H NMR and IR spectroscopy.

Example 10

This example provides the preparation of p(methyl methacrylate-co-EGDMA) using β-cyclodextrin-EGDMA complex.

Methyl methacrylate, 0.47 g (4.67 mmoles), 0.350 g (0.23 mmoles) β-cyclodextrin-EGDMA complex was dissolved in 3 ml N, N dimethyl formamide and 5 mg azobisisobutyronitrile was added. The test tube was purged with nitrogen for 15 minutes and the polymerization was carried out at 65° C. for 18 hours. The polymer was precipitated in water. It was purified by dissolving in 10 ml dichloromethane filtering and evaporating the dichloromethane. The yield of the polymer was 64%. The polymer was characterized by ¹H NMR and IR spectroscopy. The molecular weight of the polymer as characterized by GPC was $M_w$=29,900, $M_n$=11,340 and Polydispersity index 2.6.

Example 11

This example provides the preparation of p(methyl methacrylate-vinyl pyridine ethylene glycol dimethacrylate.

Methyl methacrylate 1 g (9.9 mmoles), 0.156 g (1.98 mmoles) vinyl pyridine and 0.4 g (0.297 mmoles) (β-cyclodextrin-ethylene glycol dimethacrylate complex were dissolved in 5 ml DMF. 10 mg azobisisobutyronitrile was added and the test tube was purged with nitrogen for 15 minutes.

Polymerization was carried out for 65° C. for 18 h. The polymer was obtained by precipitation in water. The yield of the polymer was 78%. The polymer was characterized by $^1$H NMR and IR spectroscopy. $^1$H NMR (DMSO d$_6$): 3.6 δ, —OCH3, 0.9-1.9 δ-(CH—CH$_2$)—, 7.22. 8.49 δ pyridine protons, 4.03 δ, 5.5 δ, =CH2. The polymer was insoluble in THF but dissolved in a mixture of tetrahydrofuran/isopropanol 50:50 v/v. The polymer had an equilibrium swelling of 71% in buffer of pH 2 and negligible swelling at pH 5.8

Example 12

This example provides the preparation of p(acrylic acid-co-ethylene glycol dimethacrylate (EGDMA)).

Acrylic acid g (0.01387 mole), 0.55 g (0.4 mmoles) β-cyclodextrin-ethylene glycol dimethacrylate complex was dissolved in 5 ml N, N dimethyl formamide. 10 mg azobisisobutyronitrile was added as the initiator and test tube is purged with nitrogen for 15 minutes. Polymerization was carried out at 65° C. for 18 hr. The polymer is obtained by precipitation in methanol. β-cyclodextrin is insoluble in methanol and can be recovered while poly(acrylic acid is soluble in methanol). The polymer was characterized by NMR and IR spectroscopy.

Example 13

This example provides the preparation of p(acrylonitrile-co-ethylene) glycol dimethacrylate (EGDMA)).

Acrylonitrile 1 g, 5.03 g (3.7 mmoles) β-cyclodextrin-ethylene glycol dimethacrylate complex was dissolved in 20 ml N, M dimethyl formamide. 16 mg azobisisobutyronitrile was added and the solution was purged with nitrogen for 15 minutes. Polymerization was carried out at 65° C. for 20 h. The polymer was characterized by IR and $^1$H NMR spectroscopy. IR (nujol): 2243 cm$^{-1}$-C≡N, 1728 cm$^1$, —C=O, 1645 cm$^{-1}$, =CH$_2$.

Example 14

This example provides the preparation of crosslinked Langmuir Blodgett film. Poly(methyl methacrylate-EGDMA) containing 20 mol % EGDMA prepared as described in example 8 was dissolved in dichloromethane along with—hydroxy cyclohexyl phenyl ketone as a photoinitiator and cast as thin film on a silicon wafer using the Langmuir-Blodgett technique. The polymer was then crosslinked using UV irradiation giving a crosslinked thin film.

Example 15

This example provides the preparation of p(N-isopropyl acrylamide-co-ethylene glycol dimethacrylate)

1 g N-isopropyl acrylamide (8.8 mmoles), 0.589 g (0.44 mmoles) β-cyclodextrin-EGDMA) complex was dissolved in 5 ml N, N dimethyl formamide in a test tube. To this 10 mg azobisisobutyronitrile was added and the tube was purged with nitrogen for 15 minutes. Polymerization was carried out at 65° C. for 18 hours. After cooling, the DMF solution was added to 200 ml cold water with stirring. The polymer was isolated by raising the temperature to 40° C. The yield of the polymer was 74%. The polymer was characterized by IR and $^1$H NMR spectroscopy. $^1$H NMR (D$_2$O): 0.9-1.2 δ, (—CH—CH$_2$)—, 2.93 δ, —CH$_3$, 3.5 δ, m, —CH, 4.03 δ EDA protons, 6.2 δ-NH.

Example 16

This example provides the preparation of p (hydroxyethyl methacrylate(HEAM)-co-ethylene glycol dimethacrylate).

2 g (HEMA) (0.015 moles), 2.05 g (1.54 mmoles) (β-cyclodextrin-ethylene glycol dimethacrylate complex was dissolved in 20 ml N, N dimethyl formamide (DMF). To this 25 mg azobisisobutyronitrile was added and the test tube was purged with nitrogen for 15 minutes. Polymerization was carried out at 65° C. for 20 hours. The polymer was isolated by precipitation in cold water. The yield of the polymer was 85%. The polymer was characterized by IR and $^1$H NMR spectroscopy. $^1$H NMR (CDCl$_3$): 2.0 δ, s, —CH$_3$ of HEMA and EDA, 4.02 δ, b, —CH$_2$, of HEMA 5.4, 6.02 δ=CH$_2$.

Example 17

This example provices the preparation of p(cetyl acrylate-co-ethylene glycol dimethacrylatecetyl acrylate).

0.5 g 1.6 mmoles, 0.427 g 0.32 mmoles (β-cyclodextrin-ethylene glycol dimethacrylate complex was dissolved in 10 ml N, N dimethyl formamide. 7 mg azobisisobutyronitrile was added and nitrogen was bubbled through the solution for 15 minutes. Polymerization was carried out 65° C. for 24 hours. The DMF solution was poured in 50 ml methanol to precipitate (β-cyclodextrin. The polymer was soluble in methanol. It was recovered by evaporation of methanol. The yield of the polymer was 50%. The polymer was characterized by IR and $^1$H NMR spectroscopy. $^1$H NMR (CDCl$_3$) 0.9-1.5 δ, cetyl methylene groups, 2.5-3.3 δ, cetyl chain protons, 5.26 δ, =CH$_2$, 4.03 δ, —CH$_2$ of EDA.

Example 18

This example provides the preparation of p(styrene-co-divinyl benzene).

1 g (9.6 mmoles) and 0.67 g (0.48 mmoles), β-cyclodextrin-divinyl benzene complex 1:1) was dissolved in 5 ml N. N dimethyl formamide and 10 mg azobisisobutyronitrile was added. Nitrogen was bubbled through the test tube for 15 minutes. Polymerization was carried out at, 65° C. for 18 hours. The polymer was isolated adding the DMF solution to 50 ml tetrahydrofuran to remove β-cyclodextrin and the polymer was re-precipitated from tetrahydrofuran. The yield was 55%. The molecular weight of the polymer as characterized by GPC was, M$_w$=11,700, M$_n$ 4170 and polydispersity index was 2.82. The polymer was characterized by $^1$H NMR and IR spectroscopy. $^1$H NMR (DMSOd$_6$): 7.4 δ, 7.37 δ, 7.29 δ aromatic protons, 6.7 δ=CH of DVB, 5.9, 5.8 δ, CH.IR (nujol) 698 cm$^{-1}$, 721 cm$^{-1}$, 844 cm$^{-1}$ mono and di substituted aromatic rings, 1597 cm$^{-1}$ aromatic ring, 1658 cm$^{-1}$ C=C.

The Advantages of the Present Invention are:
1. A simple and easy method of preparation of preparation of copolymers having multiple unsaturations.
2. Such polymers can be converted into different forms like thin films, monolayers, micro or nanoparticles and then can be crosslinked in a step to obtain tailor made polymers for wide range of applications.
3. Provides a simple method for the preparation for making graft, block or polymers with other morphologies.

The invention claimed is:
1. A process for the preparation of organic solvent soluble copolymer having general formula (A$_{(x)}$B$_{(y)}$) wherein A is a vinyl monomer comprising one unsaturation, B is a vinyl monomer comprising multiple unsaturations and x and y represent mole fractions of A and B, the said process com- prising the steps of : (a) dissolving an inclusion complex of the monomer (B) containing multiple unsaturation with β cyclodextrin in a polar aprotic organic solvent selected from the group consisting of N,N dimethyl formamide, N,N dimethyl acetamide, and dimethyl sulfoxide; and (b) adding the vinyl monomer (A) having single unsaturation and a free radical initiator to the reaction mixture of step (a) and polymerizing the solution thus formed, precipitating the polymer in water to dissolve β cyclodextrin, recover the precipitated polymer by drying to obtain organic solvent soluble copolymer which contains pendant unsaturation.

2. A process as claimed in claim 1, wherein the mole fraction x varies between 0.96 to 0.83.

3. A process as claimed in claim 1, wherein the mole fraction y varies between 0.04 to 0.17.

4. A process as claimed in claim 1, wherein the molecular weight (Mn) of the copolymer varies between 2490 to 19,700 and Mw varies between 6530 to 88,000.

5. A process as claimed in claim 1, wherein the vinyl monomer B containing multiple unsaturation is a divinyl monomer.

6. A process as claimed in claim 5, wherein the divinyl monomer B is divinyl benzene.

7. A process as claimed in claim 5, wherein the divinyl monomer B is a diacrylate.

8. A process as claimed in claim 7 wherein the diacrylate is selected from ethylene glycol diacrylate, tetra ethylene glycol diacrylate, butane diol diacrylate.

9. A process as claimed in claim 5, wherein the divinyl monomer is a dimethacrylate.

10. A process as claimed in claim 9, wherein the dimethacrylate is selected from ethylene glycol dimethacrylate, tetra ethylene glycol dimethacrylate, butane diol dimethacrylate, bisphenol A dimethcrylate.

11. A process as claimed in claim 1, wherein the vinyl monomer B containing multiple unsaturation is a triacrylate.

12. A process as claimed in claim 11, wherein the triacrylate monomer is selected from trimethylol propane triacrylate, glycerol triacrylate, trisphenol acrylate.

13. A process as claimed in claim 1, wherein the vinyl monomer B containing multiple unsaturation is a trimethacrylate.

14. A process as claimed in claim 13, wherein the trimethacrylate monomer is selected from trimethylol propane trimethacrylate, glycerol trimethacrylate, trisphenol methacrylate.

15. A process a claimed in claim 1, wherein the inclusion complex of the monomer containing multiple unsaturation B is obtained by:(a) dissolving β-cyclodextrin in water; (b) adding the monomer to the reaction mixture of (a) and stirring the same to form a precipitate;(c) filtering the precipitate and washing the same with water and (d) drying the washed precipitate to obtain the inclusion complex.

16. A process as claimed in claim 1, wherein the vinyl monomer with single unsaturation is selected from the group consisting of acrylates, methacrylates, acrylamides comprising of methyl methacrylate, ethyl acrylate, butyl acrylate, acrylic acid, methacrylic acid, acrylonitrile, vinyl acetate, glycidyl methacrylate, 2-hydroxyethel methacrylate, 2-hydroxylpropyl methacrylate, 2-amino ethyl acrylate hydrochloride butyl acrylate cetyl acrylate, cetyl methacrylate, phenol methacrylate, N-isopropyl acrylamide, acrylamide, N-t-butyl acrylamide, styrene and styrene sulfonic acid.

17. A process as claimed in claim 1, wherein in step (a), the free radical initiator used is a thermal initiator or photosensitive initiator.

18. A process as claimed in claim 17, wherein the thermal initiator is selected from the group comprising azo initiators, peroxide type initiators and redox type initiators.

19. A process as claimed in claim 18, wherein the azo initiator is azobisobutyronitrile.

20. A process as claimed in claim 18, wherein the peroxide initiator is selected from benzoylperoxide and t-butyl hydroperoxide.

21. A process as claimed in claim 18, wherein the redox initiator used is potassium persulphate and ammonium persulphate.

22. A process as claimed in claim 17, wherein the photosensitive initiator is selected from the group comprising of cumene hydroperoxide, benzoin ethyl ether, 2,2-dimethoxy-2-phenyl acetophenone, 1-hydroxy cyclothoxyl-1-phenyl ketone (Irgaxure-184), bis(2,4,6-trimethyl benzoyl)phenyl phosphine (Irgacure-819).

* * * * *